US008142046B2

(12) United States Patent
Lin

(10) Patent No.: US 8,142,046 B2
(45) Date of Patent: Mar. 27, 2012

(54) COMBINED DEVICE FOR POWER GENERATION AND ILLUMINATION MOUNTED ON THE WHEEL AXLE OF A BICYCLE

(76) Inventor: Lily Lin, Yuanshan Township, YiLan County (TW)

(*) Notice: Subject to any disclaimer, the term of this patent is extended or adjusted under 35 U.S.C. 154(b) by 318 days.

(21) Appl. No.: 12/591,279

(22) Filed: Nov. 16, 2009

(65) Prior Publication Data

US 2011/0116278 A1 May 19, 2011

(51) Int. Cl.
F21L 13/00 (2006.01)
B60Q 1/26 (2006.01)
F21V 33/00 (2006.01)
B62J 6/00 (2006.01)
B62J 6/12 (2006.01)
H02K 7/18 (2006.01)

(52) U.S. Cl. ........ 362/192; 362/475; 362/500; 310/67 A

(58) Field of Classification Search .................. 362/473, 362/474, 475, 476, 500, 192, 193; 310/67 A, 310/73, 75 C
See application file for complete search history.

(56) References Cited

U.S. PATENT DOCUMENTS

| 508,482 | A | * | 11/1893 | Mayr | 322/1 |
| 2,368,700 | A | * | 2/1945 | Bilde | 362/193 |
| 2,488,021 | A | * | 11/1949 | May | 310/75 C |
| 4,950,971 | A | * | 8/1990 | Hegi et al. | 322/1 |
| 5,523,925 | A | * | 6/1996 | Bare, IV | 362/473 |
| 6,104,096 | A | * | 8/2000 | Hicks | 290/1 R |
| 6,765,362 | B2 | * | 7/2004 | Ta-Shuo | 320/104 |
| 7,628,518 | B2 | * | 12/2009 | Fujii et al. | 362/476 |
| 2003/0227224 | A1 | * | 12/2003 | Chen | 310/75 C |
| 2006/0232988 | A1 | * | 10/2006 | Wang et al. | 362/475 |
| 2010/0019676 | A1 | * | 1/2010 | Yen | 315/78 |

* cited by examiner

Primary Examiner — David Crowe
(74) Attorney, Agent, or Firm — Rosenberg, Klein & Lee

(57) ABSTRACT

A combined device for power generation and illumination mounted on the wheel axle of a bicycle, particularly a power generator of a bicycle combined with a lamp provides two or three other functions in addition to supplying a power source. The device is a standalone device hung on or installed at an external end of the bicycle wheel axle. Unlike a traditional way of rubbing with a tire, or a traditional hub type power generator, the combined power generation and light device has the features and advantages of an easily installation, a high efficiency, a low resistance, a low cost, a low failure rate, an integrated structure, a hidden electric wire and an adjustable angle.

9 Claims, 9 Drawing Sheets

COMBINED DEVICE FOR POWER GENERATION AND ILLUMINATION MOUNTED ON THE WHEEL AXLE OF A BICYCLE

BACKGROUND OF THE INVENTION

1. Field of the Invention

The present invention relates to a combined device for power generation and illumination mounted on the wheel axle of a bicycle, and more particularly to a combined power generation and light device mounted onto an external side of a bicycle wheel axle, totally different from the traditional way of generating power by frictions produced between a hub and a tire of the bicycle.

2. Description of the Related Art

At present, there are various types of self power generation lamps used by bicycles and described as follows:

The first type is generally known as dynamo powered lamps as shown in FIG. 1, wherein a small sized power generator 11 is installed at a fork 14 of a bicycle, and a clutch 13 is used for separating the power generator 11 from a tire 15 when the lamp is not in use, and attaching a driving wheel 12 of an axle of the power generator 11 with the tire 15 if light is needed, such that rotation of the tire 15 drives the power generator to rotate, and an electromagnetic conversion process drives the power generator 11 to generate electric power and supply a power source to the bike lamp 16. However, such power generator rubbing the tire comes with the advantages of a simple structure, a low price, and an easy installation, but it still has the following shortcomings:

1. Low Efficiency: Since a single-phase power generator is adopted, the efficiency of the power generator 11 is very low, and the power generator 11 definitely requires a very high rotation speed to supply the electric power required for lighting up the bike lamp 16.

2. High failure rate: Since a high rotation speed is required, the driving wheel 12 is rotated at a very high rotation speed. However, the power generator 11 of that model does not come with a corresponding bearing for the high rotation speed, and thus incurs a high failure rate.

3. Large resistance: The power generator 11 of this model generate power by rubbing the power generator driving wheel 12 with a surface of the tire 15. To assure the contact between the power generator driving wheel 12 and the tire 15, the design of a stronger clutch 13 is provided for the tire 15 to drive the power generator 11 to rotate, so that the pressure of the power generator driving wheel 12 exerted upon the surface of the tire 15 is converted into a resistance, and bicycle rider can feel the large resistance and the hardship of riding the bike.

4. Exposure of electric wire: The bike lamp is not installed directly, and thus a segment of the electric wire 17 is exposed to connect the bike lamp 16, and the electric wire 17 may be pulled apart or deteriorated to cause a short circuit or a break of the electric wire.

The second type is a hub power generator as shown in FIG. 2, wherein the power generator 19 is combined with the hub 18, and a magnet 191 is fixed on an internal side of the hub housing 181, and both ends of a wheel shaft 182 are protruded from the hub housing 181 and mounted at a gap between the forks 14 for rotably supporting the hub housing 181, such that power is generated by a coil 192 of the wheel shaft 182. If the tire 15 is rotated to drive the hub housing 181, the magnet 191 moves with respect to the power generation coil 192 to constitute the power generation effect. Although such hub power generator features a low resistance, an integral structure and a low failure rate, yet it still has the following shortcomings:

1. Uneasy Installation: Since the power generator is installed onto the hub, a larger sized hub is required, unless the power generator is built in the wheel at the time of assembling a new bike. If such power generator is installed afterward, it is necessary to replace the entire wheel, and thus makes the installation difficult.

2. Low Efficiency: The power generator generates electric power by using the axle center, and thus its rotation speed is equal to the wheel rotation speed of the bicycle, and is much less than the rotation speed of the dynamo powered lamp. Obviously, the efficiency will become very low. In order to achieve an output power equal to that of the dynamo powered lamp, a larger power generator is required.

3. Non-detachable Device: The power generator cannot be detached from the wheel when the power generator is not in use. Although the power generator has a low resistance when it bears no load, the power generator requires a very high efficiency to meet the high output requirement by a low rotation speed, and thus the gap between the magnet and the stator must be very small, and there is a resistance occurred and creating a burden to the rider when the power generator is not in use.

4. High Price: A larger power generator incurs a higher cost.

5. Exposure of Electric Wire: The lamp cannot be installed directly, and thus a section of electric wire is exposed in order to connect the lamp, so that the exposed electric wire may be pulled apart or deteriorated to cause a short circuit or a break of the electric wire.

Obviously, both of the aforementioned conventional way of generating power for a bicycle have drawbacks and required further improvements.

SUMMARY OF THE INVENTION

A primary object of the present invention is to provide a combined device for power generation and illumination mounted on the wheel axle of a bicycle, and the combined device integrates the advantages of a dynamo power generation and a hub type power generation to overcome the shortcomings of the prior art and further combines a bike lamp with a power generator into a device to be installed at an external end of a wheel shaft without ruining the design of a bike structure, so as to enhance the structural integration and the convenient installation effect.

Another object of the present invention is to use a high-efficiency power generator to improve the efficiency of outputting the same power as the dynamo powered lamp of a high speed ratio by a very small speed ratio, so as to achieve the possibility of installing the power generator at the center of the hub. The invention has the features of a low torque and a low resistance. The power generator can be separated completely from the tire in the same way as the dynamo powered lamp when light is not needed, and thus no resistance will be produced, and the shortcomings of the aforementioned two conventional power generators can be overcome effectively.

A further object of the present invention is to use a small sized power generator for the power generation, and a small speed ratio for driving the power generator, so that the price is much lower than that of the hub type power generator. In addition, the power generator does not require a high rotation speed and it is independent from the wheel, without carrying the weights of the bike and the rider, so that the requirement for the bearing is low, and the power generator is a waterproof device, that can improve the using life and reduce the failure rate.

Still another object of the present invention is to provide an integral design, such that no external electric wire is connected to the bike lamp, and no exposed electric wire will be pulled apart or deteriorated to cause a short circuit or break of the electric wire. To fit the specifications of different tires, the angle and height of the power generator of the present invention can be adjusted freely to provide the best illumination angle.

In order to achieve the above-mentioned objects, the invention includes:

a) a head lamp, including a lamp holder, a circuit board installed in a containing space of the lamp holder, and a lamp installed at a front distal end, and electrically coupled to the circuit board, and the lamp holder having a hollow installation base disposed at the bottom of the lamp holder;

b) a power generator, including a housing for sheathing the hollow installation base; a stator installed at an internal side of the housing, a rotor coupled to an interior of the stator, a rear cover fixed at a rear side of the housing, and a front cover fixed at a front side of the housing, such that the power generator is connected to the hollow installation base, and a front end of an axle center of the rotor is protruded from the front cover; and c) a transmission device, including a connecting base, a connecting hole formed at the center of the transmission device, a gear holding slot extended from a lateral side of the transmission device; a wheel shaft fixing cover, secured onto the connecting hole by a screw, and having a through hole formed at the center of the wheel shaft fixing cover and sheathed and fixed onto an external end of the wheel shaft of a bicycle; a gear pressure plate, being circular in shape and installed at an external periphery of the wheel shaft fixing cover; a driving gear, installed in the connecting base, and disposed at an external periphery of the gear pressure plate, and being in a rotating status; a power generator roller, installed onto an axle center of the rotor protruded from the front cover, and directly or indirectly driven by the driving gear; a driving ring, coupled to a front side of the driving gear by a plurality of support pins, and having a lug disposed at an external periphery of the driving ring and coupled to the spoke;

thereby, when the bicycle is moving, the wheel is rotated to synchronously drive the driving ring and driving gear to rotate, and further drive the rotor of the power generator to rotate and generate electric power, and a power cord is connected externally from the stator to a circuit board of the head lamp for supplying required electric power.

DETAILED DESCRIPTION OF THE PREFERRED EMBODIMENT

Figure 1:
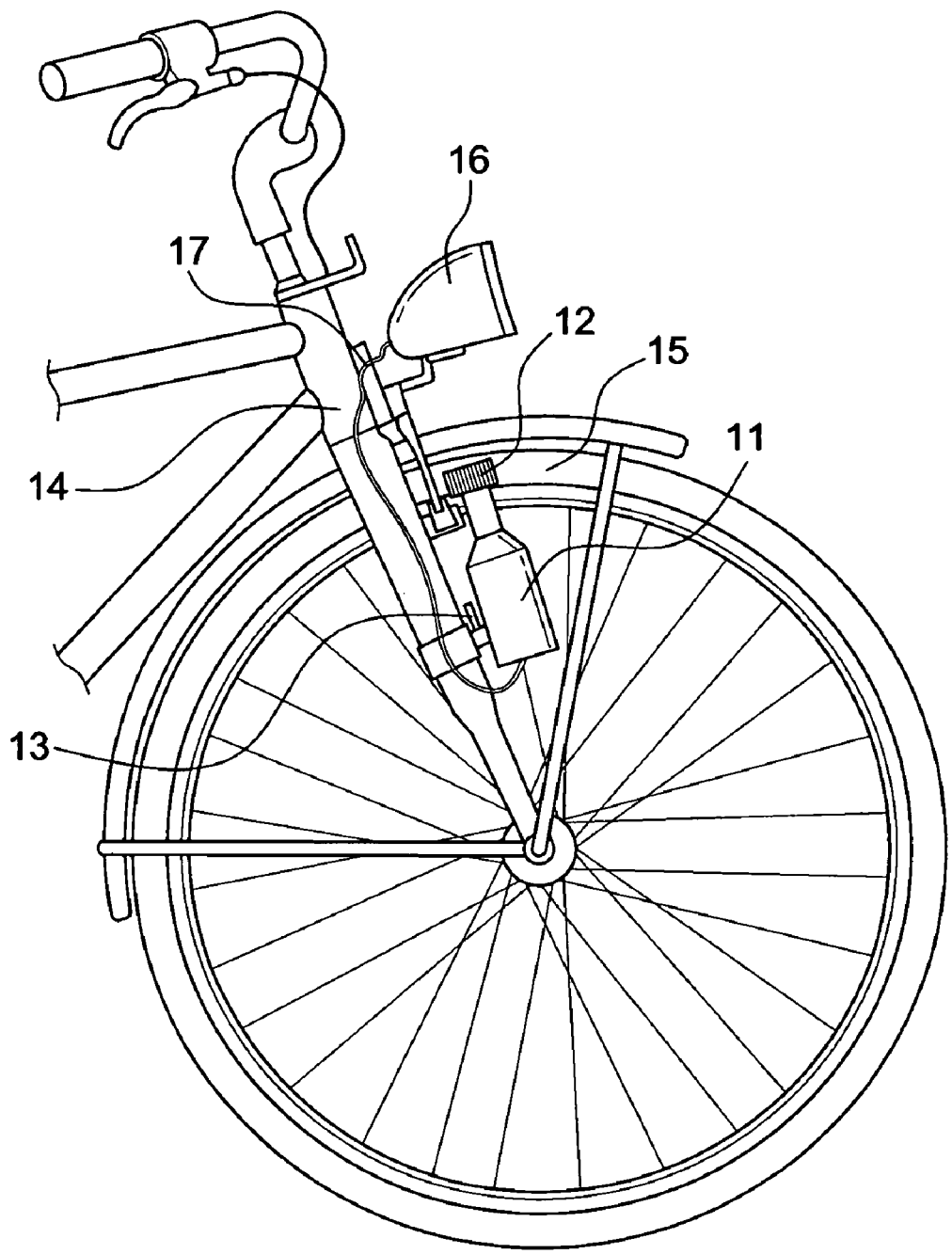
FIG. 1 is a schematic view of a conventional dynamo power generator.
Figure 2:
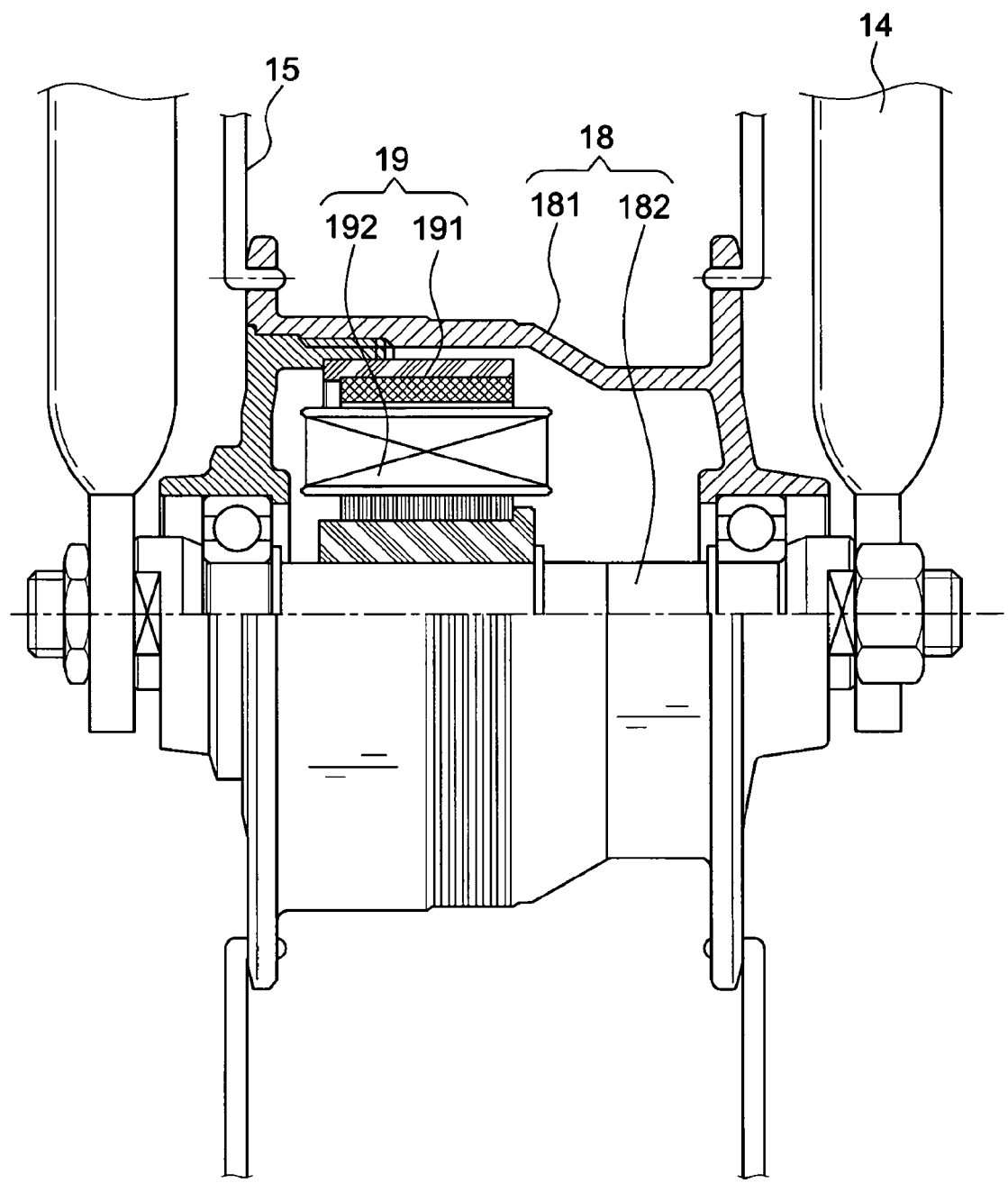
FIG. 2 is a schematic view of a conventional hub power generator.

With reference to FIGS. 3 to 10 for a combined power generator and lamp device 50 of the present invention, the combined device 50 is formed by combining a head lamp 20, a power generator 30 coupled to the head lamp 20, and a transmission device 40 coupled to a wheel 70. The present invention is characterized in that the combined device 50 is hung and installed at an external portion of a wheel shaft 73 of the wheel 70. In other words, the combined device 50 will not ruin the original structure of the bicycle at all, and the combined device 50 can be detached quickly when it is not in use.

Figure 7:
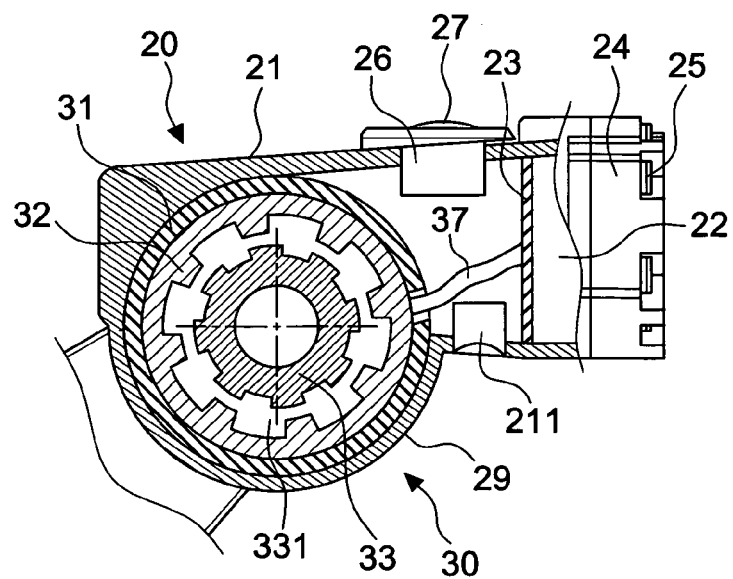
FIG. 7 is a cross-sectional view of Section 7-7 of FIG. 5.

The head lamp 20 includes a lamp holder 21, a circuit board 23 installed in a containing space 22 of the lamp holder 21, a lamp 24 installed at a front side of the lamp holder 21 and electrically coupled to the circuit board 23, and a hollow installation base 29 disposed at the bottom of the lamp holder 21. In this preferred embodiment, the lamp 24 is secured onto an external side of the containing space 22 by a plurality of screws 25. The lamp holder 21 further includes a head lamp switch 26 and a press button 27 installed at an upper surface of the lamp holder 21 and a waterproof plug 28 installed at a lower surface of the lamp holder 21. In FIG. 7, the lamp holder 21 includes a power output port 211 disposed at the bottom of the lamp holder 21 and electrically coupled to the circuit board 23, wherein the power output port 211 of this preferred embodiment is a mini USB socket, but not limited to such arrangement only.

The power generator 30 includes a housing 31 sheathed onto the hollow installation base 29, a stator 32 installed at an internal side of the housing 31, a rotor 33 coupled to the stator 32, a rear cover 35 fixed to a rear end of the housing 31, and a front cover 36 fixed to a front end of the housing 31, such that the power generator 30 is combined with the hollow installation base 29, wherein a front end of an axle center 331 of the rotor 33 is protruded from the front cover 36, wherein both ends of the rotor axle center 331 of the power generator 30 in this preferred embodiment include a bearing 34, and the two sleeve bearings 34 are installed in bearing housings 361, 351 of the front and rear covers 36, 35 respectively, such that the rotor 33 can be rotated smoothly, and the bearing 34 can be a sleeve bearing or a ball bearing. In addition, the power generator 30 is a single-phase power generator, but it is not limited to such arrangement only, and the power generator 30 can be a tri-phase power generator used for this invention.

Figure 3:
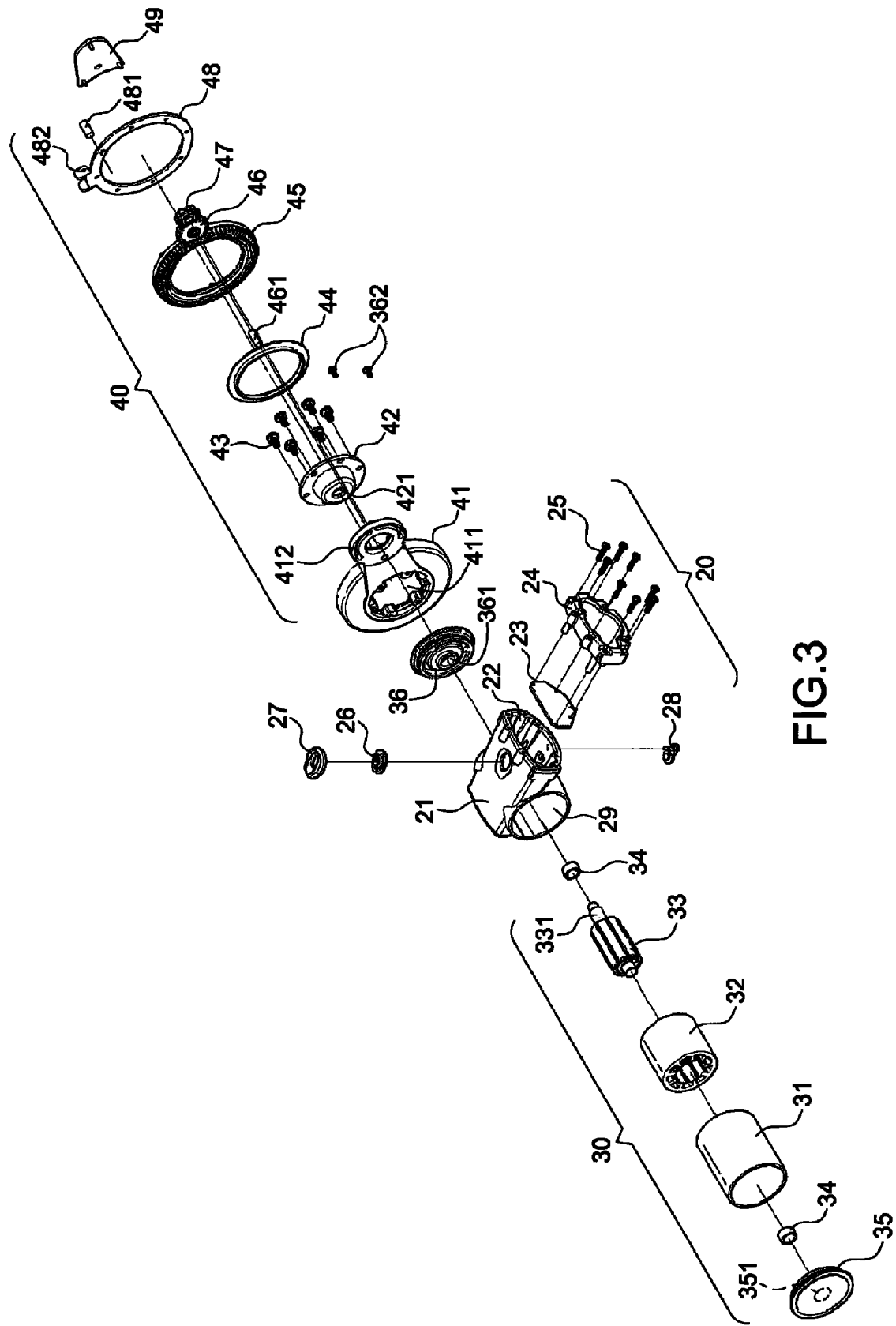
FIG. 3 is an exploded view of a preferred embodiment of the present invention.
Figure 4:
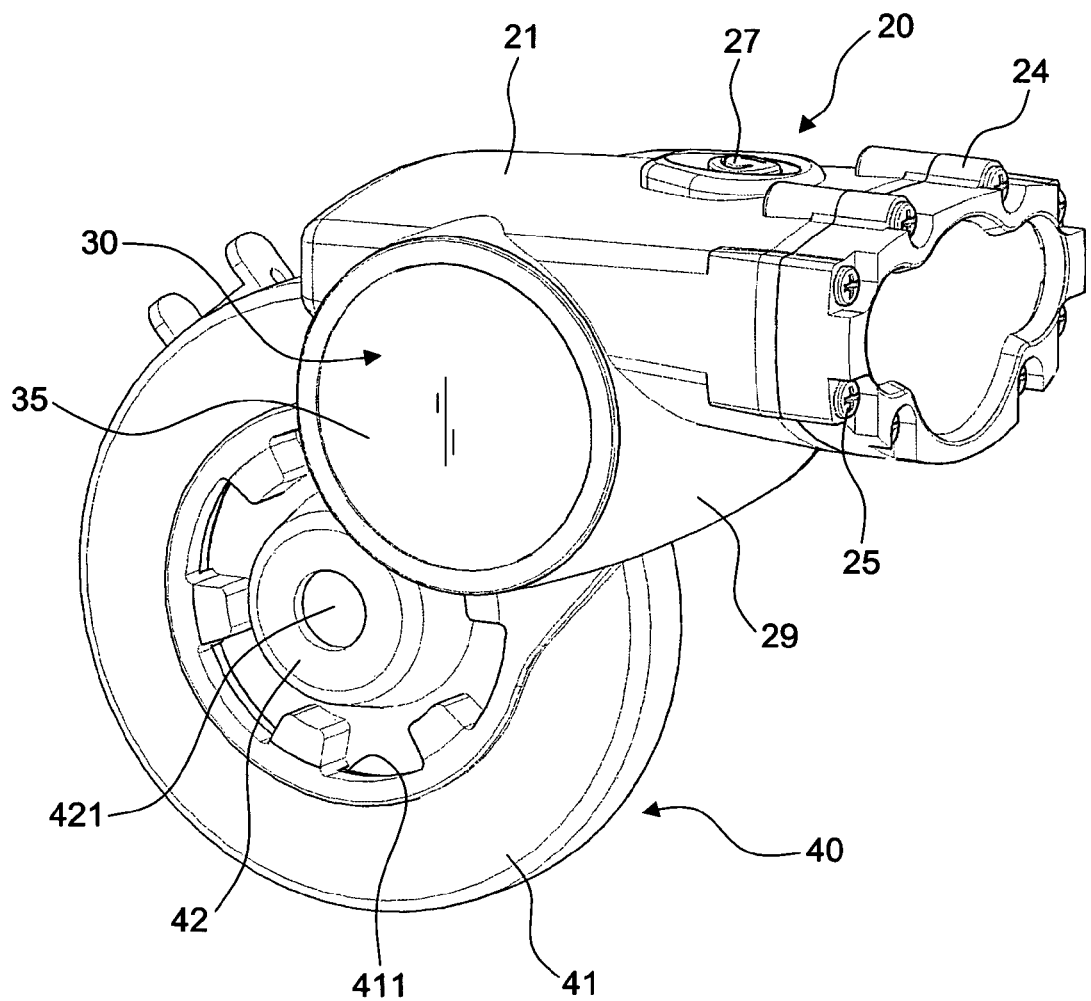
FIG. 4 is a perspective view of a preferred embodiment of the present invention.
Figure 5:
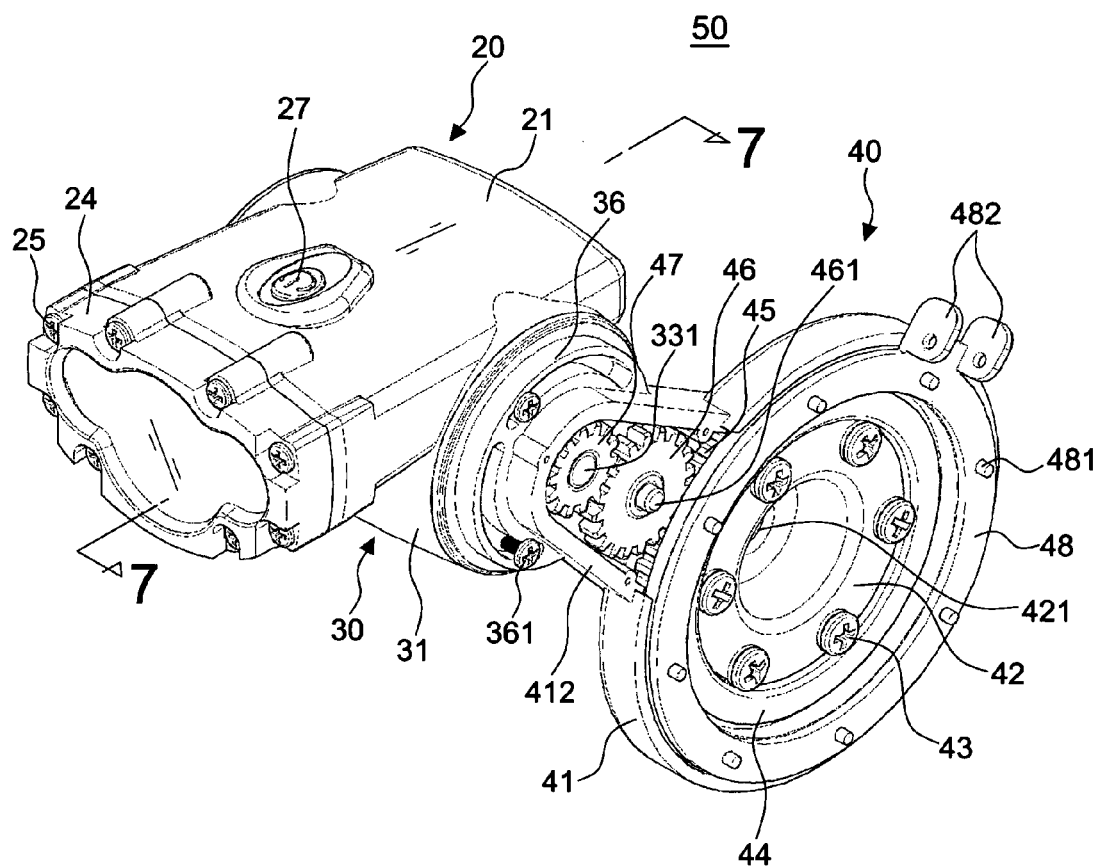
FIG. 5 is a perspective view of a preferred embodiment of the present invention viewed from another angle.
Figure 9:
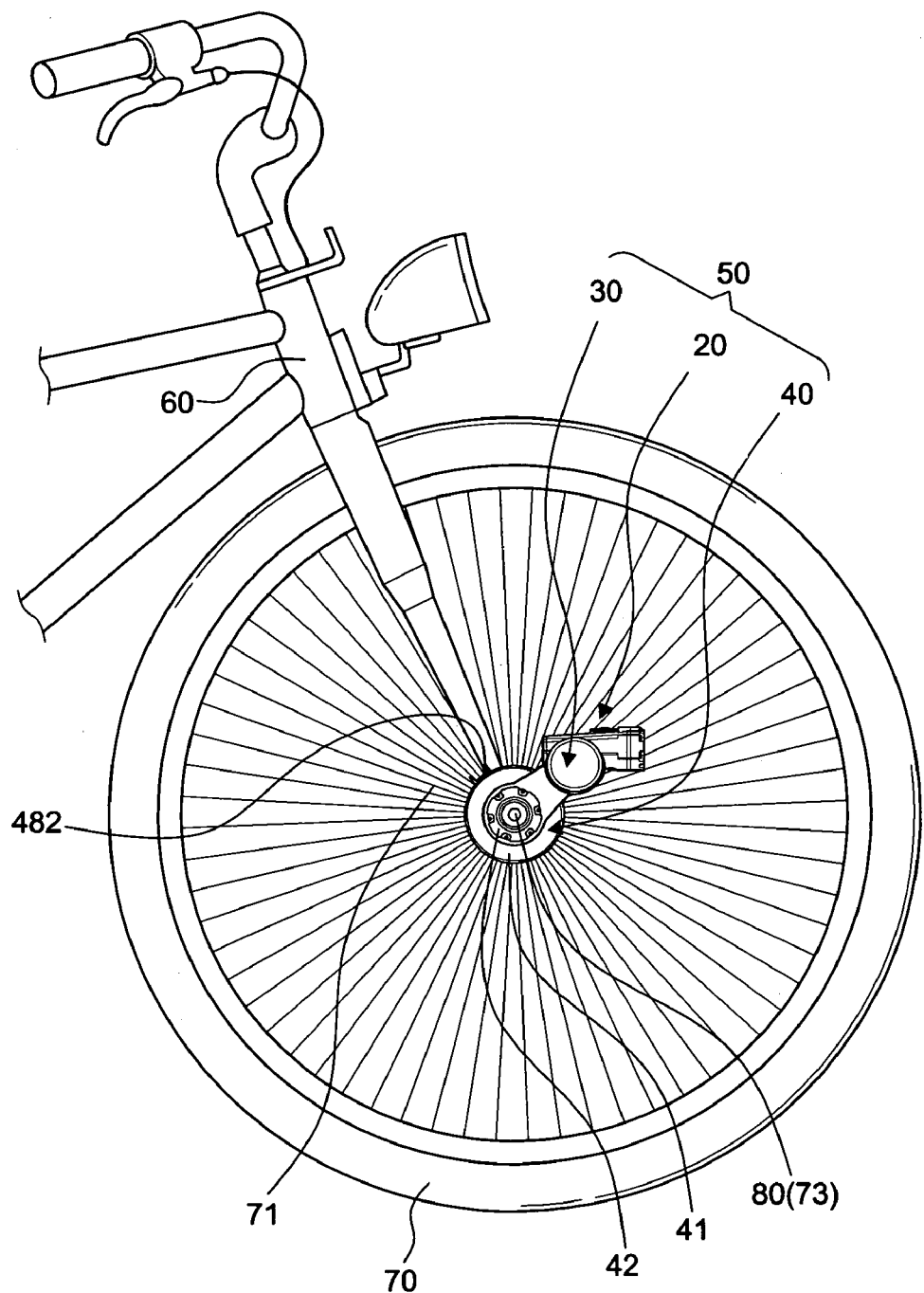
FIG. 9 is a schematic view of a combined power generation and light device installed on a side of a wheel in accordance with the present invention.
Figure 10:
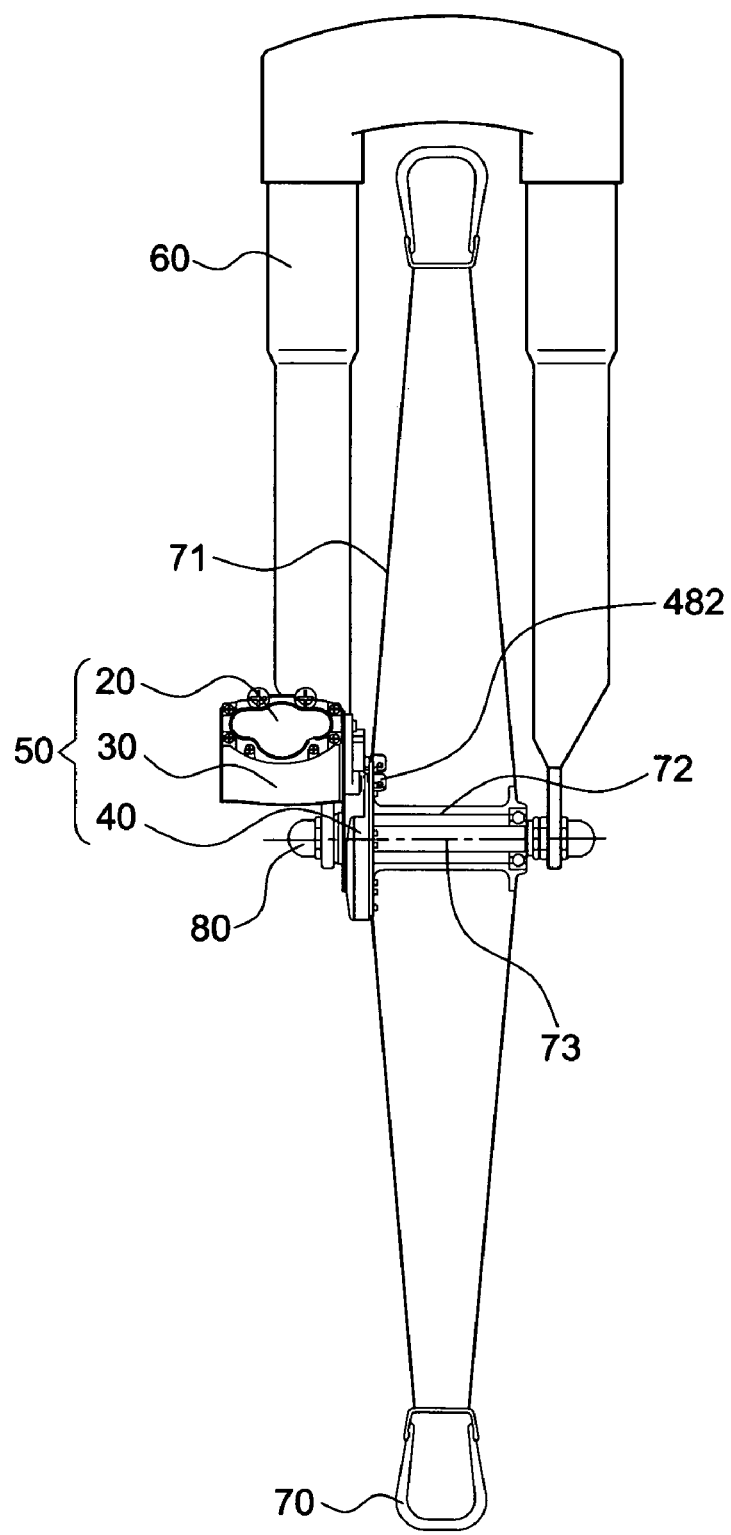
FIG. 10 is a front view of a combined power generation and light device installed to a wheel in accordance with the present invention.

The transmission device 40 comprises: a connecting base 41 having a connecting hole 411 formed at the center of the connecting base 41 and a gear holding slot 412 extended from a lateral side of the connecting base 41; a wheel shaft fixing cover 42 secured to the connecting hole 411 by a screw 43, and having a through hole 421 formed at the center of the wheel shaft fixing cover 42 for sheathing and fixing an external end of a wheel shaft 73 of a bicycle; a gear pressure plate 44, being circular in shape, and installed at an external periphery of the wheel shaft fixing cover 42; a driving gear 45, installed in the connecting base 41, and disposed at an external periphery of the gear pressure plate 44, and capable of being rotated; a power generator roller 47, installed onto an axle center 331 of the rotor 33 protruded from the front cover 36, and directly or indirectly driven by the driving gear 45; a driving ring 48, coupled with a front side of the driving gear 45 by a plurality of support pins 481, and having a lug 482 disposed at an external periphery of the driving ring 48 and coupled to a spoke 71; wherein the wheel shaft fixing cover 42 of the transmission device 40 in this preferred embodiment is secured onto an external end of the wheel shaft 73 by a nut 80 as shown in FIGS. 9 and 10. In other words, the wheel shaft 73 is protruded from an external end of the bike frame 60. Since the wheel shaft 73 is combined and fixed to the bike frame 60, therefore the wheel shaft 73 cannot be rotated, and the connecting base 41 is secured to the wheel shaft 73 and not rotated. The rotating components as shown in FIG. 5 include the driving ring 48 and the driving gear 45 linked to the driving ring 48, and the driving ring 488 is coupled with the spoke 71 by a pair of lugs 482 as shown in FIG. 10, such that when the bicycle is moving, the spoke 71 of the wheel 70 and a hub 72 are rotated by using the wheel shaft 73 as an axle center to drive the driving ring 48 and the driving gear 45 to rotate synchronously in the connecting base 41. In this preferred embodiment, an idler pulley 46 is installed between the driving gear 45 and the power generator roller 47, but the invention is not limited to such arrangement only, and the driving gear 45 can be installed for driving the power generator roller 47 directly, and the idler pulley 46 is fixed into the gear holding slot 412 by an idler axle 461 as shown in FIG. 3, and an open side of the gear holding slot 412 includes a cover 49 (not shown in FIGS. 5 and 6).

Figure 6:
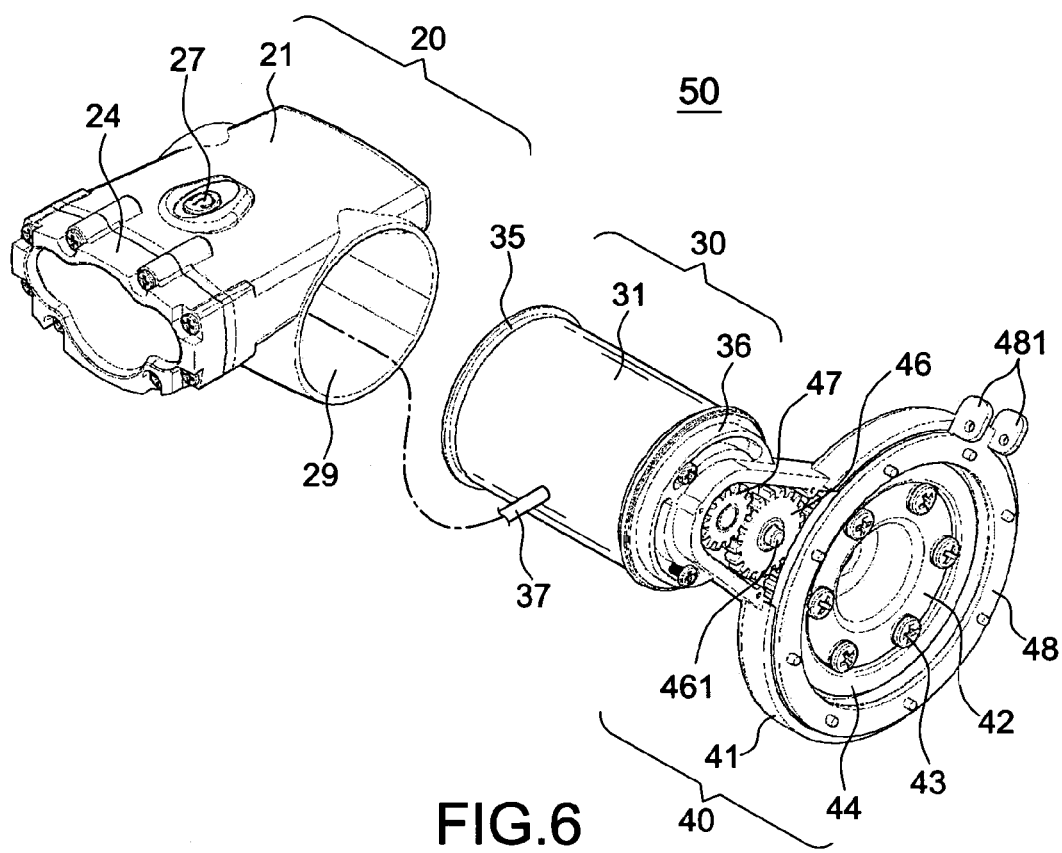
FIG. 6 is a schematic view of a power generator separated from a head lamp in accordance with the present invention.

In FIGS. 6 and 7, a battery (not shown in the figure) is installed in the containing space 22 of the head lamp 20, and the circuit board 23 can be set into a charging mode, and the head lamp 20 and the power generator 30 can be detached and removed, such that the built-in battery is used for supplying electric power for the purpose of illumination.

Figure 8A:
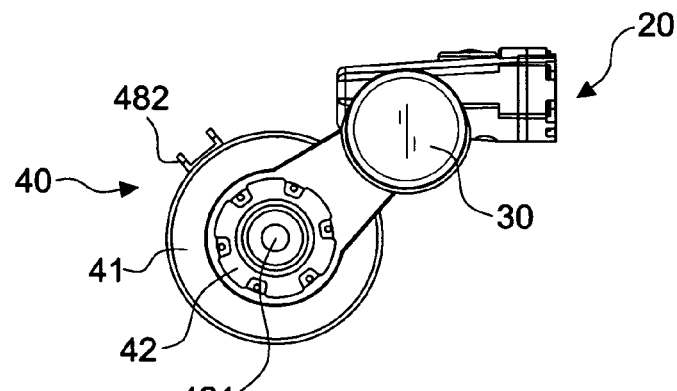
FIGS. 8A, 8B and 8C are schematic views of angle adjustments of a head lamp and a power generator in accordance with the present invention.
Figure 8B:
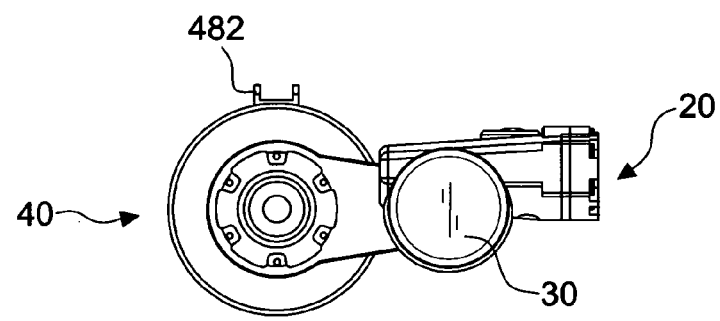
Figure 8C:
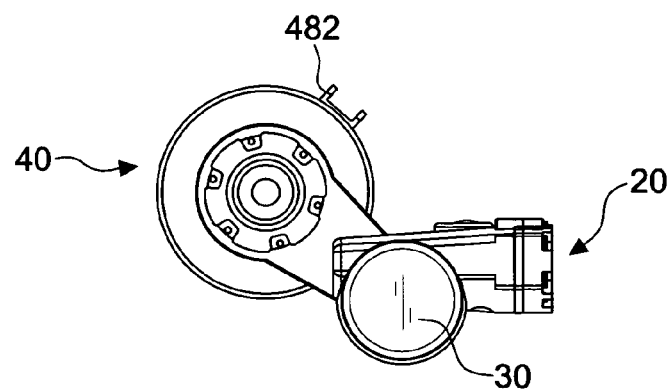

In FIGS. 8A, 8B and 8C, angles of the head lamp 20 and the power generator 30 can be adjusted freely according to the specification and height of the bicycle to provide the best illumination angle before the combined device of the present invention is installed.

When the bicycle is moving, the wheel 70 synchronously drive the driving ring 48 and the driving gear 45 to rotate, and further drive the rotor 33 of the power generator 30 to generate electric power, and a power cord 37 is provided for connecting the stator 32 to a circuit board 23 of the head lamp 20 to supply the required electric power.

What is claimed is:

1. A combined device for power generation and illumination mounted on the wheel axle of a bicycle, comprising:
   a) a head lamp, including a lamp holder, a circuit board installed in a containing space of the lamp holder, and a lamp installed at a front distal end, and electrically coupled to the circuit board, and the lamp holder having a hollow installation base disposed at the bottom of the lamp holder;
   b) a power generator, including a housing for sheathing the hollow installation base; a stator installed at an internal side of the housing, a rotor coupled to an interior of the stator, a rear cover fixed at a rear side of the housing, and a front cover fixed at a front side of the housing, such that the power generator is connected to the hollow installation base, and a front end of an axle center of the rotor is protruded from the front cover; and
   c) a transmission device, including a connecting base, a connecting hole formed at the center of the transmission device, a gear holding slot extended from a lateral side of the transmission device; a wheel shaft fixing cover, secured onto the connecting hole by a screw, and having a through hole formed at the center of the wheel shaft fixing cover and sheathed and fixed onto an external end of the wheel shaft of a bicycle; a gear pressure plate, being circular in shape and installed at an external periphery of the wheel shaft fixing cover; a driving gear, installed in the connecting base, and disposed at an external periphery of the gear pressure plate, and capable of being rotated; a power generator roller, installed onto the axle center of the rotor protruded from the front cover, and directly or indirectly driven by the driving gear; a driving ring, coupled to a front side of the driving gear by a plurality of support pins, and having a lug disposed at an external periphery of the driving ring and coupled to the spoke;

thereby, when the bicycle is moving, the wheel is rotated to synchronously drive the driving ring and driving gear to rotate, and further drive the rotor of the power generator to rotate and generate electric power, and a power cord is connected externally from the stator to the circuit board of the head lamp for supplying required electric power.

2. The combined device for power generation and illumination mounted on the wheel axle of a bicycle as recited in claim 1, wherein the lamp holder of the head lamp includes a head lamp switch and a press button installed at an upper surface of the lamp holder, and a waterproof plug installed at a lower surface of the lamp holder.

3. The combined device for power generation and illumination mounted on the wheel axle of a bicycle as recited in claim 1, wherein the lamp holder includes a power output port disposed at the bottom of the lamp holder and electrically coupled to the circuit board.

4. The combined device for power generation and illumination mounted on the wheel axle of a bicycle as recited in claim 1, wherein the rotor axle center of the power generator includes a bearing installed separately at both ends of the rotor axle center, and the two bearings are installed in the bearing housing of the front and rear covers respectively.

5. The combined device for power generation and illumination mounted on the wheel axle of a bicycle as recited in claim 1, wherein the power generator is a single-phase power generator or a tri-phase power generator.

6. The combined device for power generation and illumination mounted on the wheel axle of a bicycle as recited in claim 1, wherein the wheel shaft fixing cover of the transmission device is secured at an external end of the wheel shaft by a nut.

7. The combined device for power generation and illumination mounted on the wheel axle of a bicycle as recited in claim 1, further comprising an idler pulley installed between the driving gear and the power generator roller.

8. The combined device for power generation and illumination mounted on the wheel axle of a bicycle as recited in claim 7, wherein the gear holding slot includes a cover installed at an open side of the gear holding slot.

9. The combined device for power generation and illumination mounted on the wheel axle of a bicycle as recited in claim 1, wherein the containing space of the head lamp contains a built-in battery, and the circuit board includes a charge mode, and the head lamp and the power generator can be detached, such that the built-in battery can be used for supplying power independently for illumination.

* * * * *